United States Patent
Boyarski et al.

(10) Patent No.: US 8,016,258 B1
(45) Date of Patent: Sep. 13, 2011

(54) SUSPENSION ADJUSTMENT MECHANISM FOR LOW SUSPENSION SEAT

(75) Inventors: Jesse C. Boyarski, Richland Center, WI (US); Pieter J. van Zyl, Viola, WI (US)

(73) Assignee: Seats, Inc., Reedsburg, WI (US)

( * ) Notice: Subject to any disclaimer, the term of this patent is extended or adjusted under 35 U.S.C. 154(b) by 13 days.

(21) Appl. No.: 12/771,159

(22) Filed: Apr. 30, 2010

(51) Int. Cl.
*F16M 13/00* (2006.01)

(52) U.S. Cl. .... 248/576; 248/421; 248/588; 297/344.15

(58) Field of Classification Search .................. 248/576, 248/560, 565, 421, 567, 577, 587, 588, 590; 297/344.15; 267/131
See application file for complete search history.

(56) References Cited

U.S. PATENT DOCUMENTS

| | | |
|---|---|---|
| 2,401,748 A | 6/1946 | Dillon |
| 2,637,369 A | 5/1953 | Demarest et al. |
| 2,701,693 A | 2/1955 | Nordmark et al. |
| 3,059,966 A | 10/1962 | Spielman |
| 3,086,742 A | 4/1963 | Severson |
| 3,338,632 A | 8/1967 | Kleinsorge |
| 3,525,490 A | 8/1970 | Duncan et al. |
| 3,560,049 A | 2/1971 | Burton |
| 3,561,703 A | 2/1971 | Stencel |
| 3,581,620 A | 6/1971 | Hauck et al. |
| 3,599,232 A | 8/1971 | Tabor |
| 3,628,634 A | 12/1971 | Valukonis |
| 3,655,968 A | 4/1972 | Moore et al. |
| 3,762,505 A | 10/1973 | Morse |
| 3,779,591 A | 12/1973 | Rands |
| 3,788,697 A | 1/1974 | Barton et al. |
| 3,874,626 A | 4/1975 | Gross et al. |
| 3,913,707 A | 10/1975 | Wastenson et al. |
| 3,913,975 A | 10/1975 | Carter |
| 3,985,388 A | 10/1976 | Hogan |

(Continued)

FOREIGN PATENT DOCUMENTS

EP 0078479 5/1983

OTHER PUBLICATIONS

Autoflug GmbH, Safety Seat System, Imdex Asia 2009, available online at: <http://www.defense-update.com/products/a/autoflug.htm>, Singapore Expo, May 12-14, 2009.

(Continued)

*Primary Examiner* — Ramon Ramirez
(74) *Attorney, Agent, or Firm* — Michael Best & Friedrich LLP (57) ABSTRACT

A seat support assembly includes a base, a plurality of arms each mounted at a first end to the base for movement with respect to the base, and mounted to a seat at a second end opposite the first end for movement with respect to the seat. A torsion spring has a first end defining a length, a second end defining a length, and a coil defining an axis. A first bearing surface abuts the first end of the torsion spring at a first abutment point to define a first moment arm distance. A second bearing surface abuts the second end of the torsion spring at a second abutment point to define a second moment arm distance. An adjustment mechanism simultaneously causes relative movement between the torsion spring and the bearing surfaces to simultaneously change the first moment arm distance and the second moment arm distance.

24 Claims, 12 Drawing Sheets

U.S. PATENT DOCUMENTS

| | | | |
|---|---|---|---|
| 4,029,283 A | 6/1977 | Swenson et al. | |
| 4,047,759 A | 9/1977 | Koscinski | |
| 4,072,287 A | 2/1978 | Swenson et al. | |
| 4,128,217 A | 12/1978 | Mazelsky | |
| 4,150,805 A | 4/1979 | Mazelsky | |
| 4,241,894 A | 12/1980 | Okuyama | |
| 4,358,154 A | 11/1982 | Campbell | |
| 4,359,200 A | 11/1982 | Brevard et al. | |
| 4,397,440 A | 8/1983 | Hall et al. | |
| 4,408,738 A | 10/1983 | Mazelsky | |
| 4,423,848 A | 1/1984 | Mazelsky | |
| 4,448,386 A | 5/1984 | Moorhouse et al. | |
| 4,492,408 A | 1/1985 | Lohr | |
| 4,523,730 A | 6/1985 | Martin | |
| 4,525,010 A | 6/1985 | Trickey et al. | |
| 4,603,907 A | 8/1986 | Witzke | |
| 4,714,227 A | 12/1987 | Holm et al. | |
| 4,729,539 A | 3/1988 | Nagata | |
| 4,822,094 A | 4/1989 | Oldfather et al. | |
| 4,852,849 A | 8/1989 | Jones | |
| 4,856,763 A | 8/1989 | Brodersen et al. | |
| 4,997,233 A | 3/1991 | Sharon | |
| 5,125,598 A | 6/1992 | Fox | |
| 5,222,915 A | 6/1993 | Petrzelka et al. | |
| 5,253,924 A | 10/1993 | Glance | |
| 5,273,240 A | 12/1993 | Sharon | |
| 5,338,091 A | 8/1994 | Miller | |
| 5,364,060 A | 11/1994 | Donovan et al. | |
| 5,439,271 A | 8/1995 | Ryan | |
| 5,487,562 A | 1/1996 | Hedderly et al. | |
| 5,542,638 A | 8/1996 | Smith | |
| 5,558,301 A | 9/1996 | Kerdoncuff et al. | |
| 5,651,585 A | 7/1997 | Van Duser | |
| 5,676,336 A | 10/1997 | Nefy et al. | |
| 5,692,705 A | 12/1997 | Bellais | |
| 5,743,591 A | 4/1998 | Tame | |
| 5,758,859 A | 6/1998 | Gonzalez | |
| 5,794,911 A * | 8/1998 | Hill | 248/588 |
| 5,842,669 A | 12/1998 | Ruff | |
| 5,927,679 A | 7/1999 | Hill | |
| 5,984,410 A | 11/1999 | Brodersen | |
| 6,152,534 A | 11/2000 | Maeda et al. | |
| 6,186,467 B1 | 2/2001 | Wahls | |
| 6,237,889 B1 | 5/2001 | Bischoff | |
| 6,299,252 B1 * | 10/2001 | Frohnhaus et al. | 297/338 |
| 6,347,778 B1 | 2/2002 | Koga et al. | |
| 6,357,729 B1 * | 3/2002 | Takata | 267/131 |
| 6,361,117 B1 | 3/2002 | Tate | |
| 6,378,939 B1 | 4/2002 | Knoll et al. | |
| 6,394,393 B1 | 5/2002 | Mort | |
| 6,409,243 B1 | 6/2002 | Hansen | |
| 6,585,190 B2 | 7/2003 | Mort | |
| 6,773,049 B2 | 8/2004 | Rupiper et al. | |
| 6,776,384 B2 * | 8/2004 | Igarashi | 248/421 |
| 6,820,931 B2 | 11/2004 | Ruff et al. | |
| 6,913,314 B2 | 7/2005 | Hansen | |
| 6,935,693 B2 | 8/2005 | Janscha et al. | |
| 7,032,874 B2 | 4/2006 | Meyers et al. | |
| 7,063,382 B2 | 6/2006 | Ali et al. | |
| 7,070,236 B2 | 7/2006 | Kawashima | |
| 7,134,713 B1 | 11/2006 | Tseng | |
| 7,134,721 B2 | 11/2006 | Robinson | |
| 7,147,287 B2 | 12/2006 | Kuivala | |
| 7,168,671 B2 | 1/2007 | Bostrom et al. | |
| 7,185,867 B2 | 3/2007 | Hill et al. | |
| 7,246,836 B2 | 7/2007 | Hahn | |
| 7,393,030 B2 | 7/2008 | Steeg et al. | |
| 7,445,181 B2 | 11/2008 | Knoll et al. | |
| 7,484,781 B1 | 2/2009 | Garber et al. | |
| 7,744,155 B2 | 6/2010 | List et al. | |
| 2006/0001306 A1 * | 1/2006 | Becker et al. | 297/344.15 |
| 2009/0066126 A1 | 3/2009 | Stevens | |
| 2010/0102602 A1 | 4/2010 | Hansen | |
| 2010/0117408 A1 | 5/2010 | Hansen | |
| 2010/0207433 A1 | 8/2010 | Hahn | |

OTHER PUBLICATIONS

Industrial Seats, Division of United Group, Air Suspension Kit for Freightliner, M2 Medium Duty Trucks, 2002 & Up, available online at: <http:/www.industrialseats.com/product.asp?pgrID=86&categoryID=23&pID=239>, published prior to Jul. 6, 2004.

National Seating, published prior to Jul. 6, 2004.

Federal Motor Vehicle Safety Standards (FMVSS), 49 CFR Ch. V (Oct. 1, 2005 Edition), Sections 571.207 and 571.210, USA. Standards predate Jul. 6, 2004.

The Society of Automotive Engineers, Inc. (SAE), Surface Vehicle Recommended Practice, Issued Apr. 1999, pp. 1-11, J2287, Society of Automotive Engineers, Inc., Copyright 1999, USA.

The C.E. White Co., New! Drivers Safety Seat, Model ISH-2002, The C.E. White Co., 2003, New Washington, Ohio, USA.

Kubota Corporation, photographs of an adjustable seat suspension assembly, publicly disclosed prior to Nov. 21, 2002.

Milsco Manufacturing Company, promotional material of an adjustable seat suspension assembly, published prior to Nov. 21, 2002.

Seats Incorporated, drawings of an adjustable seat suspension assembly, publicly disclosed prior to Nov. 21, 2002.

* cited by examiner

SUSPENSION ADJUSTMENT MECHANISM FOR LOW SUSPENSION SEAT

BACKGROUND

The present invention relates to suspension systems for vehicle seats.

SUMMARY

In one embodiment, the invention provides a seat support assembly including a base, first, second, third, and fourth suspension arms. Each of the suspension arms is mounted at a first end to the base and moveable with respect to the base, and adapted for mounting to a seat at a second end opposite the first end, the arms being moveable with respect to the seat. A torsion spring has a first end defining a length, a second end defining a length, and a coil between the first and second ends, and the coil defines a torsion spring axis. A first bearing surface abuts the first end of the torsion spring at a first abutment point to define a first moment arm distance from the first abutment point to the torsion spring axis. A second bearing surface abuts the second end of the torsion spring at a second abutment point to define a second moment arm distance from second abutment point to the torsion spring axis. An adjustment mechanism simultaneously causes relative movement between the torsion spring and the first and second bearing surfaces to simultaneously move the first abutment point along the length of the first end of the torsion spring to change the first moment arm distance, and move the second abutment point along the length of the second end of the torsion spring to change the second moment arm distance.

In another embodiment the invention provides a seat support assembly including a base, a suspension including a plurality of suspension arms, each of the arm mounted at a first end to the base and moveable with respect to the base, and adapted for mounting to a seat at a second end opposite the first end, the arms being moveable with respect to the seat. A torsion spring has a first end defining a length, a second end defining a length, and a coil between the first and second ends; the coil defines a torsion spring axis. A first bearing surface abuts the first end of the torsion spring at a first abutment point to define a first moment arm distance from the first abutment point to the torsion spring axis. A second bearing surface abuts the second end of the torsion spring at a second abutment point to define a second moment arm distance from second abutment point to the torsion spring axis. An adjustment mechanism simultaneously causes relative movement between the torsion spring and the first and second bearing surfaces to simultaneously move the first abutment point along the length of the first end of the torsion spring, to change the first moment arm distance, and move the second abutment point along the length of the second end of the torsion spring, to change the second moment arm distance.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
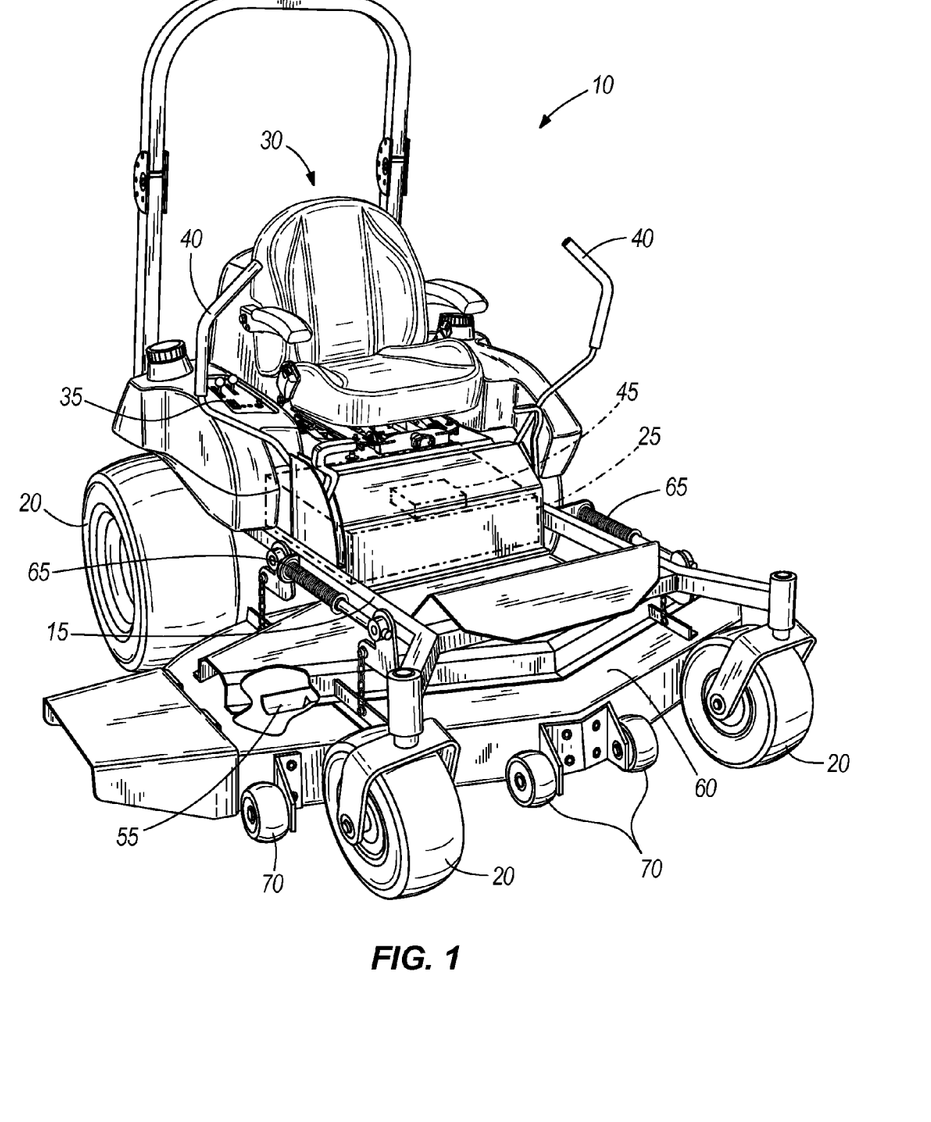
FIG. 1 is a perspective view of an exemplary off-highway vehicle having a seat and a seat support assembly according to the present invention.

FIG. 1 illustrates an off-highway vehicle 10 that includes a chassis 15, wheels 20 supporting the chassis 15, an internal combustion engine 25 mounted to the chassis 15, and a seat 30 mounted to the chassis 15. An operator zone of the vehicle 10 includes the seat 30, a control panel 35 within reach of an operator seated in the seat 30, and control levers 40 within reach of an operator seated in the seat 30. The illustrated off-highway vehicle 10 is commonly referred to as a zero-turn radius lawn mower, but the invention may be embodied in other types of off-highway vehicles and other vehicles intended for road use; the invention is not limited to the application illustrated.

In the illustrated embodiment, the engine 25 includes an ignition system 45 that provides a spark or other event that drives combustion within the internal combustion engine 25. Although the engine 25 in the illustrated embodiment is of the internal combustion variety, the invention is applicable to any type of engine, and the term "ignition system," as applied to this invention, refers to the part of the engine that sustains its continued operation. In this regard, the ignition system 45 may be termed an ignition circuit that permits operation of the engine 25 when closed and disables operation of the engine 25 when open. Although the illustrated embodiment includes an internal combustion engine 25, the present invention may be applied to vehicles and systems having alternative prime movers, such as batteries or other energy storage devices, fuel cells, or gas/electric hybrid drive systems. In such other embodiments, the ignition system would include the electric circuit that enables and disables the prime mover to operate or that enables and disables the vehicle drive and implement systems to operate under the influence of the prime mover.

In the illustrated embodiment, the engine 25 drives rotation of at least one of the wheels 20 through a transmission (e.g., a hydraulic, electric, or mechanical transmission). The operator independently controls speed and direction of rotation of the left and right side wheels 20 via the control levers 40. The engine 25 also selectively drives rotation of one or more cutting blades 55 under a mower deck 60 to cut vegetation over which the vehicle 10 travels. The mower deck 60 is raised and lowered with respect to the chassis by operation of deck actuators 65 which may be controlled by switches on the control panel 35. The mower deck 60 may include wheels 70 or other mechanisms to facilitate the deck 60 moving smoothly over ground to maintain an even cutting height for the blades 55.

Figure 2:
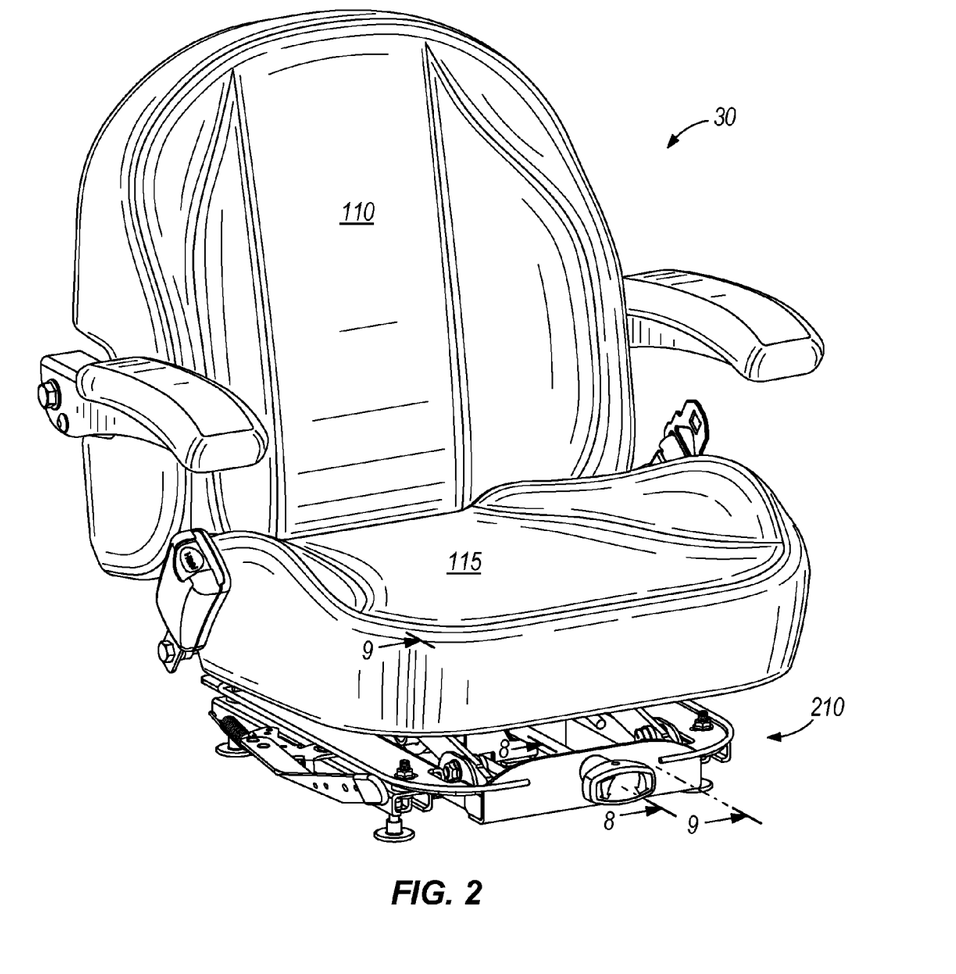
FIG. 2 is a perspective view of the seat and seat support assembly of FIG. 1.
Figure 3:
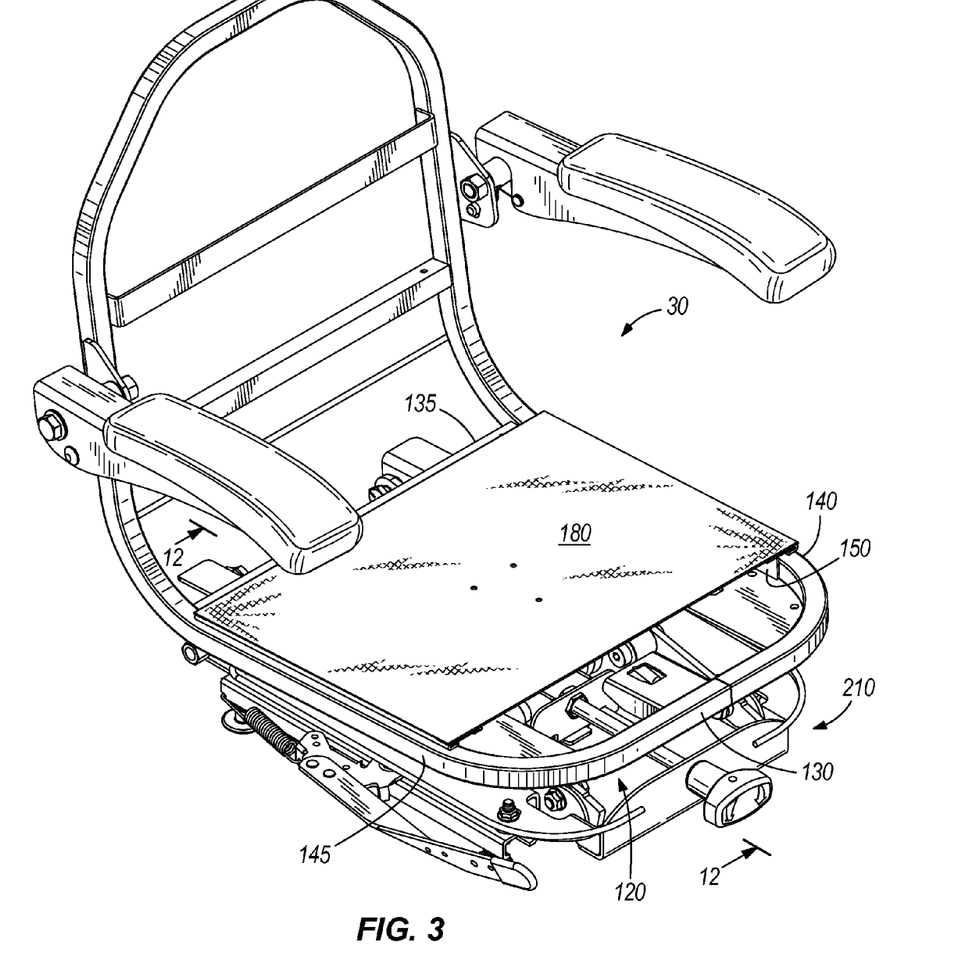
FIG. 3 is a perspective view of the seat and seat support assembly of FIG. 2 with cushions removed for illustrative purposes.

With reference to FIGS. 2 and 3, the seat 30 includes back and bottom cushions 110, 115, respectively, to accommodate an operator of the vehicle 10. The seat 30 includes a seat frame 120 that includes front and rear portions 130, 135, respectively, and left and right side portions 140, 145, respectively, extending between the front and rear portions 130 and 135. The terms "front," "rear," "left," and "right" refer to the perspective of an operator seated in the seat 30 for normal use. A "front portion" of the seat 30 is that portion proximate the calves of the legs of an operator seated in the seat 30. The "front portion" is closer to the front portion 130 of the frame 120 than to the rear portion 135, and a "rear portion" of the seat 30 is that portion closer to the rear portion 135 of the frame 120 than to the front portion 130.

The side portions 140, 145 include support brackets 150 to which are mounted a resilient web 180, such that the web 180 extends across the seat frame 120 between the left and right side portions 140, 145. The illustrated web 180 is made of a flexible, strong, resilient material. One suitable material for use in the web 180 is sold under the Dymetrol trademark of E. I. Du Pont De Nemours and Company. A top surface of the web 180 supports the bottom cushion 115 of the seat 30, and a bottom surface of the web 180 faces down away from the cushion 115.

Figure 4:
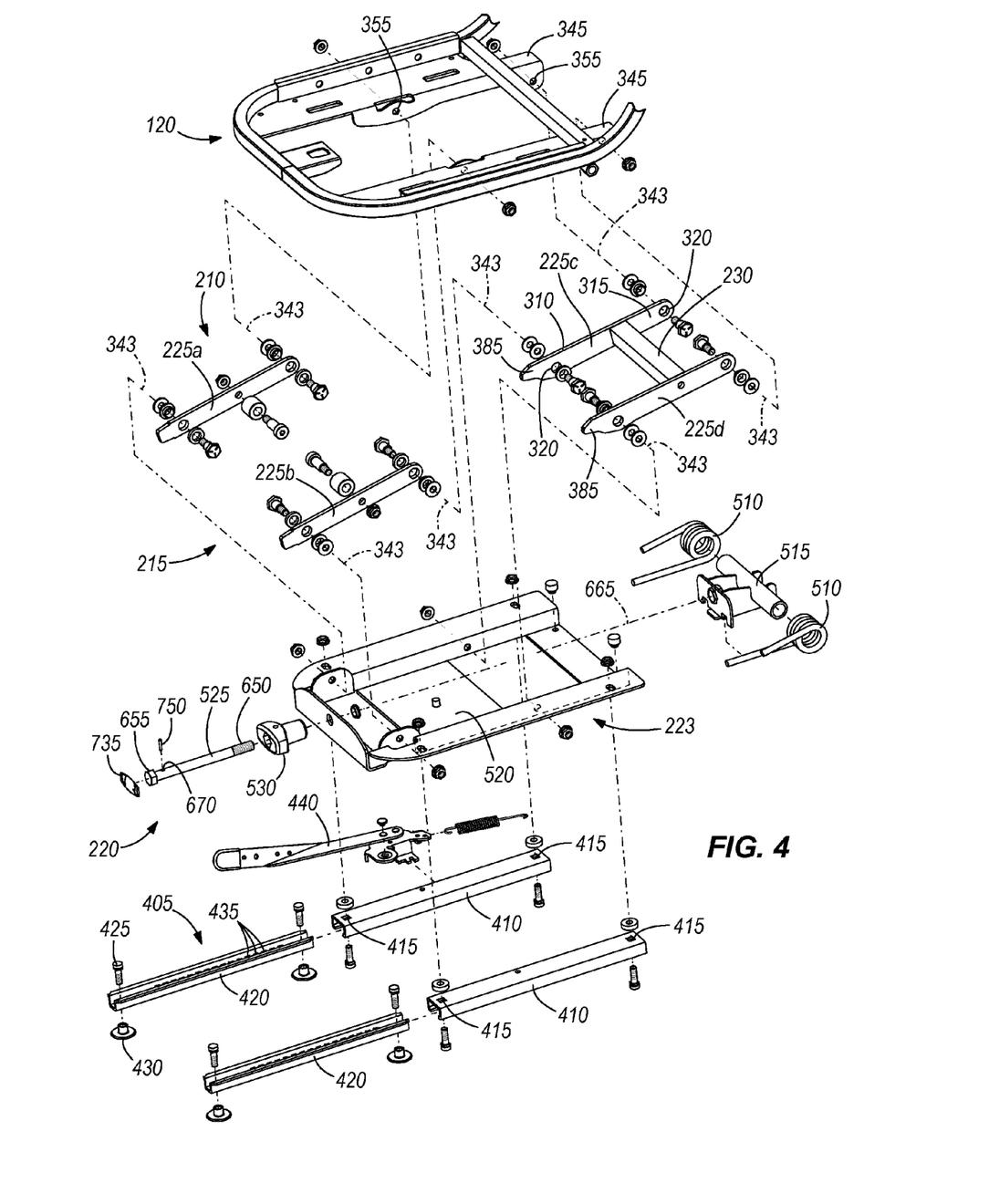
FIG. 4 is an exploded view of the seat support assembly.

Referring primarily to FIG. 4, the seat 30 is supported by a seat support assembly 210 which includes a suspension 215 and a suspension adjustment mechanism 220. Certain subassemblies and parts within the seat support assembly 210 and suspension 215 are enlarged and illustrated in FIGS. 5-8 for clarity. The illustrated suspension 215 includes a suspension base 223, a first suspension arm 225a, a second suspension arm 225b, and a rear suspension assembly that includes a third suspension arm 225c, a fourth suspension arm 225d, and a brace 230 interconnecting the third suspension arm 225c and the fourth suspension arm 225d.

Figure 6:
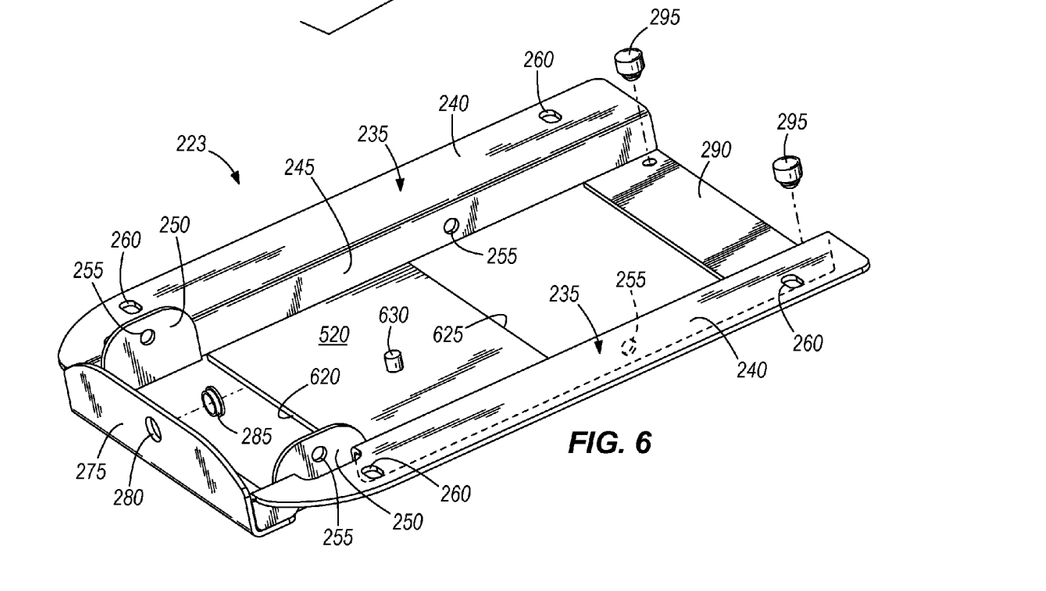
FIG. 6 is an enlarged perspective view of a suspension base.

With reference to FIG. 6, the suspension base 223 includes two side brackets 235. The side brackets 235 are made of metal and are shaped with a ninety-degree)(90°) angle between a horizontal leg 240 and a vertical leg 245. An ear 250 is mounted to the vertical leg 245 of each side brackets 235, near the front of the side brackets 235. The ears 250 are flat, vertically-extending plates. Mounting holes 255 are formed in each ear 250 and in the vertical leg 245 of each side bracket 235. The mounting holes 255 in the vertical legs 245 are toward the rear of the side brackets 235, or at least rearward of center. The horizontal leg 240 of each side bracket 235 includes front and rear mounting apertures 260. The suspension base 223 further includes a front support plate 275, which extends between the front ends of the side brackets 235. The front support plate 275 includes a support hole 280, into which is received a low-friction bushing 285. The suspension base 223 also includes a rear plate 290 which is horizontal and is mounted to the rear end of each of the side brackets 235. Mounted to the rear plate 290 are a pair of bumpers 295.

Figure 5:
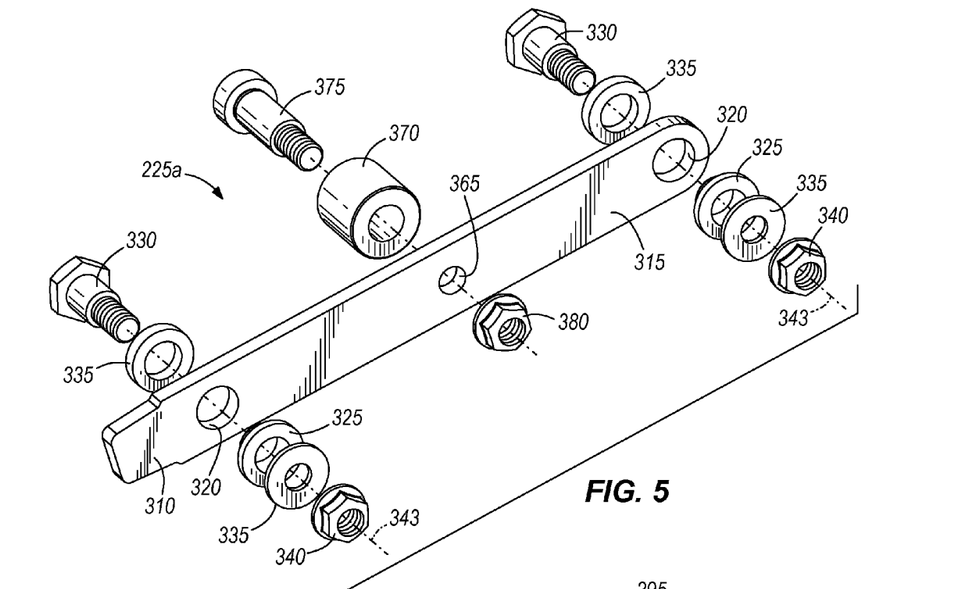
FIG. 5 is an enlarged perspective view of a suspension arm subassembly.

Referring now to FIG. 5, the first suspension arm 225a is illustrated. The second suspension arm 225b is a substantially identical mirror image of the first suspension arm 225a, and therefore the following description applies to the second suspension arm 225b as well. To avoid clutter in FIG. 4, no reference numerals are provided on the second suspension arm 225b. The first suspension arm 225a includes a first end 310 and a second end 315 opposite the first end 310. A mounting hole 320 is formed in each of the first end 310 and second end 315. A low friction bushing 325 sits in each mounting hole 320. The mounting hole 320 and bushing 325 in the first end 310 aligns with the mounting hole 255 in one of the ears 250.

A shoulder bolt 330 extends through the bushing 325 and the aligned pair of mounting holes 320, 255, and is secured with washers 335 and a nut 340. Consequently, the first end 310 of the suspension arm 225a is pivotally mounted to ear 250, with the shoulder bolt 330 defining a pivot axis 343 for the first ends 310. The second end 315 of the suspension arm 225a is similarly mounted to bottom mounting brackets 345 (FIG. 4) of the seat frame 120. More specifically, the bottom mounting brackets 345 include mounting holes 355 which align with the mounting holes 320 in the second ends 315 of the suspension arm 225a. The same assembly of a bushing 325, a shoulder bolt 330, two washers 335, and a nut 340 as are used on the first end 310 are used on the second end 315.

The first suspension arm 225a also includes a mounting hole 365 to which a roller bearing 370 is mounted with a shoulder bolt 375 and nut 380 in the illustrated embodiment. The smooth shank of the shoulder bolt is sized such that roller bearing 370 rotates freely on the shoulder bolt 375, even when the nut is tightened onto the threaded end of the shoulder bolt 375. The mounting hole 365 is between the mounting holes 320 in the first and second ends 310, 315 and is generally in the middle of the first suspension arm 225a in the illustrated embodiment. The illustrated roller bearing 370 is on an inner side of the first suspension arm 225a. The "inner side" of each of the first and second suspension arm 225a, 225b is the side facing toward the other of the first and second suspension arm 225a, 225b. In other embodiments, the roller bearing 370 is positioned in one or more other locations, or other suitable bearings are used in place of or in addition to the illustrated roller bearing 370. For example, and without limitation, the roller bearings 370 or other bearings or bearing surfaces may be attached to or part of the seat frame 120, or the bottom mounting brackets 345 specifically.

With reference to FIGS. 4-6, the third and fourth suspension arms 225c, 225d are substantial mirror images of each other and similar to the first and second suspension arms 225a, 225b in most respects, so the same reference numerals are used and only the third suspension arm 225c is described and numbered to avoid clutter. The illustrated third suspension arm 225c is pivotally mounted to one of the side brackets 235 of the suspension base 223 by aligning the mounting hole 320 in the first end 310 of the third suspension arm 225c with the mounting hole 255 in the vertical leg 245 of the side bracket 235 and using the same assembly of a bushing 325, a shoulder bolt 330, two washers 335, and a nut 340 as is described above for the first end 310 of the first suspension arm 225a. Similarly, the second end 315 of the third suspension arm 225c of the illustrated embodiment is pivotally mounted to the bottom mounting bracket 345 by aligning the mounting holes 320, 355 and using a similar assembly of a bushing 325, a shoulder bolt 330, a washer 335, and a nut 340 as is described above. As a result of the above-described assembly, the first and second ends 310, 315 of each of the suspension arms 225a, 225b, 225c, 225d are pivotally mounted about parallel pivot axes 343. A feature in the third and fourth suspension arms 225c, 225d that is not included in the first and second suspension arms 225a, 225b, is a range limiting projection 385 on the first end 310. In another embodiment, the suspension arms 225a, 225b, 225c, 225d are connected in a scissor configuration. Regardless of the specific mechanical arrangement of the suspension 215, the suspension arms 225a, 225b, 225c, 225d slide, pivot or otherwise move with respect to the suspension base 223 to adjust the suspension 215, as will be discussed in more detail below.

The suspension 215 is supported by a track system 405 that includes a pair of top U-shaped tracks 410 that have mounting apertures 415 that align with the front and rear mounting apertures 260 in the horizontal legs 240 of the side brackets 235. Each top U-shaped track 410 is mounted to the respective horizontal leg 240 by way of bolts, washers or spacers, and nuts, as illustrated. The track system also includes a pair of lower U-shaped tracks 420 that are mounted to the floor of the off-highway vehicle by way of bolts 425. The illustrated feet 430 are useful for protecting the threaded ends of bolts 425 during shipping, but are removed upon installation. At least one of the lower U-shaped tracks 420 includes locking apertures 435 at discrete intervals. The seat 30 and seat support assembly 210 are adjustable forward and rearward along the track system 405 to a desired position. Once at the desired position, a spring-biased locking lever 440 is released and engages one or more of the locking apertures 435 to retain the seat 30 and seat support assembly 210 in the desired position.

Figure 7:
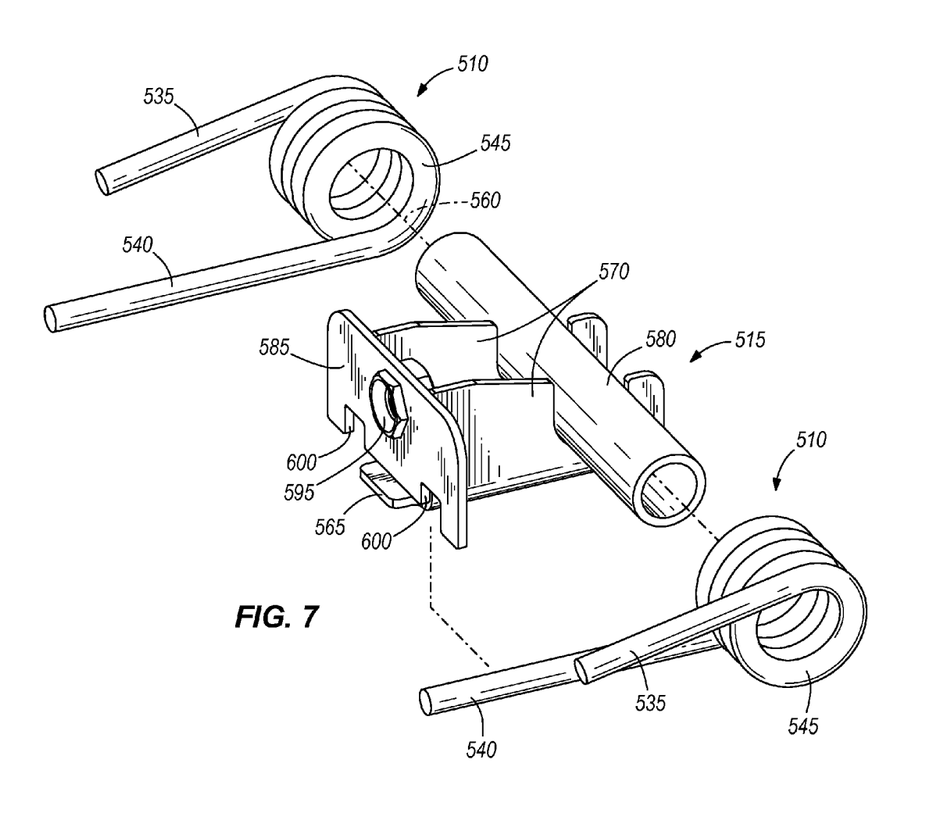
FIG. 7 is an enlarged perspective view of a spring support and torsion springs from the suspension.

The suspension adjustment mechanism 220 includes a pair of torsion springs 510, a spring support 515, a support plate 520, an adjustment rod 525, and a handle 530. With reference to FIG. 7, the torsion springs 510 each include a first end 535, a second end 540, and a coil 545 between the first and second ends 535, 540. Each of the first and second ends 535, 540 includes a length. The coil 545 defines a torsion spring axis 560 which is perpendicular to the extent of the first and second ends 535, 540.

The spring support 515 includes a base plate 565, a pair of vertical supports 570, a cross member 580 mounted to and extending to each side beyond the vertical supports 570, and a face plate 585. The base plate 565 includes a slot 590 between the vertical supports 570 (visible in FIGS. 12 and 13). The vertical supports 570 are welded or otherwise permanently affixed to the base plate 565 in the illustrated embodiment, but in other embodiments may be integrally formed and bent to be perpendicular to the base plate 565. The cross member 580 is a tube in the illustrated embodiment and is welded or otherwise permanently affixed to the vertical supports 570. Each of the free ends of the cross member 580 extends through the coil 545 of one of the torsion springs 510, such that the coil springs 510 are mounted adjacent the outer surfaces of the vertical supports 570. The cross member 580 includes a longitudinal axis that is parallel to (and substantially collinear with) the torsion spring axes 560. The axes 560 of the torsion springs 510 and cross member 580 are parallel to the pivot axes 343 of the first and second ends 310, 315 of the suspension arms 225a, 225b, 225c, 225d, in the illustrated embodiment. The face plate 585 includes a threaded aperture 595 and a pair of bottom slots 600. The threaded aperture 595 may be provided by a nut that is brazed, welded or otherwise permanently affixed in a hole in the face plate 585. The first end 535 of each torsion spring 510 extends over the top of the face plate 585, and the second end 540 of each torsion spring 510 extends through one of the bottom slots 600.

Referring to FIG. 6, the support plate 520 is mounted to the bottom of the side brackets 235. A front edge 620 of the support plate 520 is rearward of the mounting holes 255 in the ears 250 (i.e., rearward of the pivot point for the first ends 310 of the first and second suspension arms 225a, 225b), and a rear edge 625 of the support plate 520 is forward of the rear mounting holes 255 in the vertical legs 245 of the side brackets 235 (i.e., forward of the pivot point for the first ends 310 of the third and fourth suspension arms 225c, 225d). The support plate 520 includes a stopper 630, which may be a peg or stub, for example. The spring support 515 sits on the support plate 520 with the base plate 565 of the spring support 515 against the top surface of the support plate 520, and with the stopper 630 in the slot 590 (see FIGS. 12, 13). The spring support 515 may slide or otherwise move over the top surface of the support plate 520 within the range of motion permitted by the stopper 630 in the slot 590.

Figure 8:
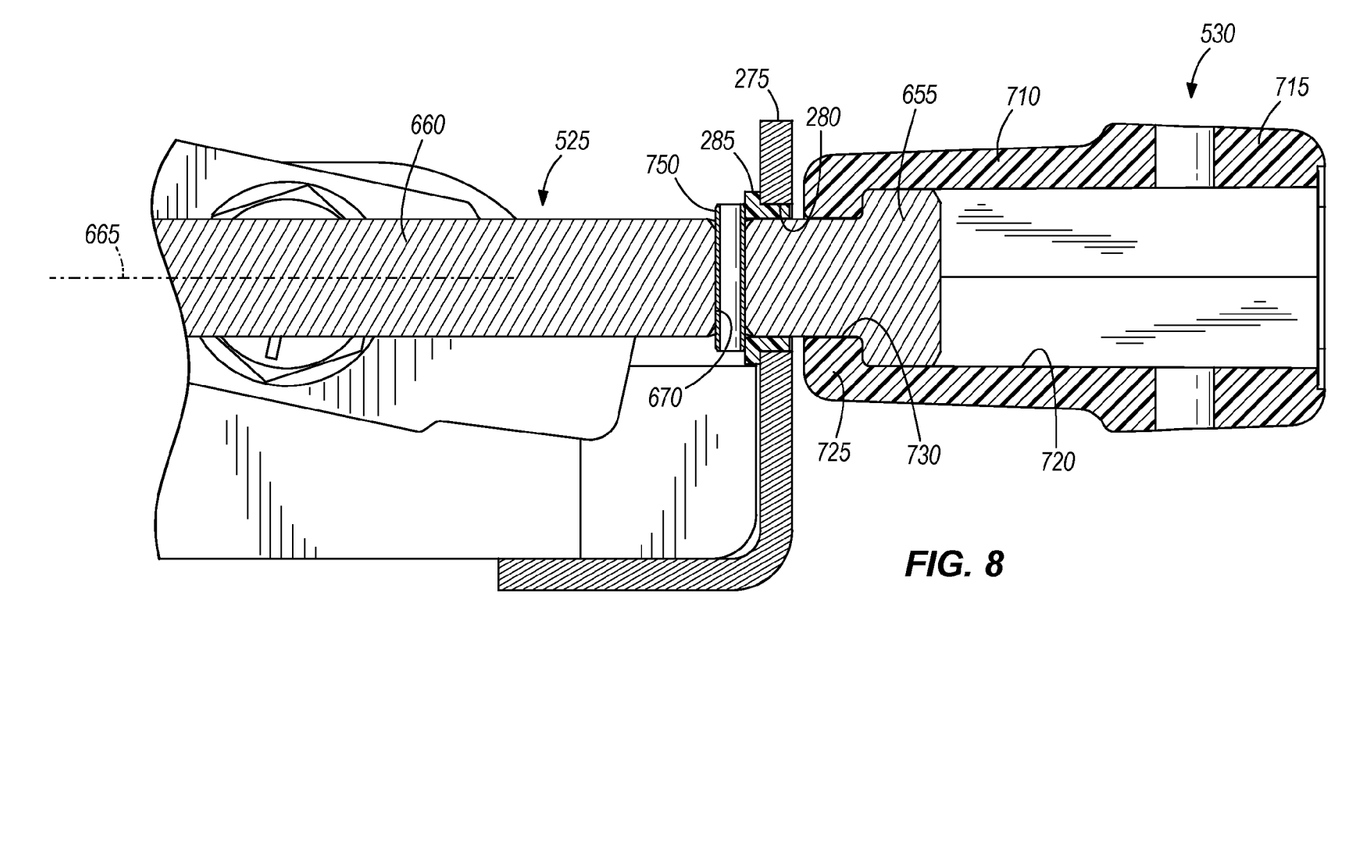
FIG. 8 is a cross-sectional view of a portion of the suspension adjustment mechanism, taken along line 8-8 in FIG. 2.

Referring to FIGS. 4 and 8, the adjustment rod 525 includes a threaded end 650 at one end, a head 655 at the opposite end, and a circular cross-section smooth shaft 660 in between. The adjustment rod 525 defines a longitudinal axis 665. In the illustrated embodiment, the adjustment rod 525 is a long bolt, with the head 655 being a bolt head or hex head. In other embodiments, the head 655 can be other non-circular shapes or shapes having one or more flats. The threaded end 650 of the adjustment rod 525 could include a worm gear or other means for converting rotational motion of the adjustment rod 525 about the longitudinal axis 665 into linear movement of the spring support 515, as will be discussed in more detail below. The adjustment rod 525 includes a pin hole 670 in the shaft 660, extending perpendicular to the longitudinal axis 665.

The handle 530 is generally T-shaped, with a cylindrical base 710 and a wide end 715. The cylindrical base 710 is integrally formed or permanently affixed to the wide end 715 at one end, and includes an opposite free end. A counter bore 720 having a shape that mates with the head 655 of the adjustment rod 525 extends through the wide end 715 and deeply into the cylindrical base 710. The free end of the cylindrical base 710 includes an end wall 725 through which is formed a circular hole 730 of size sufficient to accommodate the shaft 660 of the adjustment rod 525. The circular hole 730 is coaxial with the counter bore 720. A cover plate 735 with surface indicia to instruct a user how to turn the handle 530 is affixed over the wide end 715 of the handle 530, covering the counter bore 720.

The suspension adjustment mechanism 220 is assembled as follows. The torsion springs 510 are mounted on the cross member 580 of the spring support 515, and the spring support 515 is positioned on the support plate 520 with the stopper 630 received in the slot 590. The adjustment rod 525 is extended through the counter bore 720 and circular hole 730 in the handle 530, with the head 655 of the adjustment rod 525 bottoming out in the counter bore 720 against the end wall 725. The counter bore 720 and circular hole 730 are centered on the longitudinal axis 665 of the adjustment rod 525. The threaded end 650 of the adjustment rod 525 is then extended through the low-friction bushing 285 in the support hole 280 in the front support plate 275 of the suspension base 223, and is threaded into the threaded aperture 595 in the face plate 585 of the spring support 515. The adjustment rod longitudinal axis 665 extends perpendicular to the axes 560 of the torsion springs 510 and the cross member 580 of the spring support 515, and perpendicular to the pivot axes 343 of the suspension arms 225a, 225b, 225c, 225d. With the adjustment rod 525 properly installed, the pin hole 670 in the adjustment rod 525 is exposed behind the front support plate 275. A retaining pin 750 is inserted into the pin hole 670, such that the front support plate 275 and end wall 725 of the handle 530 are trapped between the head 655 of the adjustment rod and the retaining pin 750. Because the shape of the counter bore 720 mates with the head 655 of the adjustment rod 525, the handle 530 and adjustment rod 525 are coupled for rotation about the longitudinal axis 665 of the adjustment rod 525. The shape of the handle 530 facilitates grasping by the hand of a user, and rotating about the longitudinal axis 665. As will be discussed in more detail below, as the adjustment rod 525 is rotated about its longitudinal axis 665, the threaded interconnection between the threaded end 650 of the adjustment rod 525 and the threaded aperture 595 of the spring support 515 causes the spring support 515 to move linearly forward and rearward.

Figure 10:
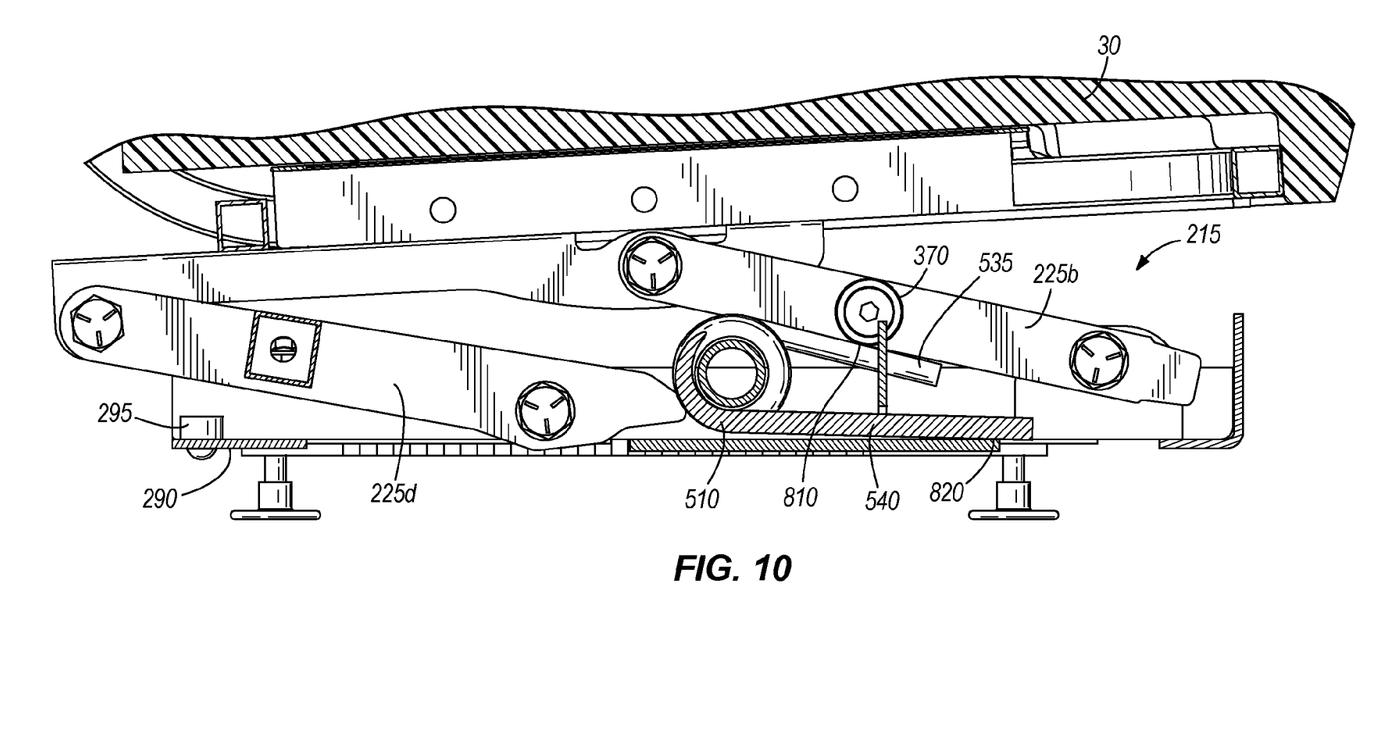
FIG. 10 is a cross-sectional view of the seat support assembly taken along line 9-9 in FIG. 2, with the suspension in a middle position.
Figure 11:
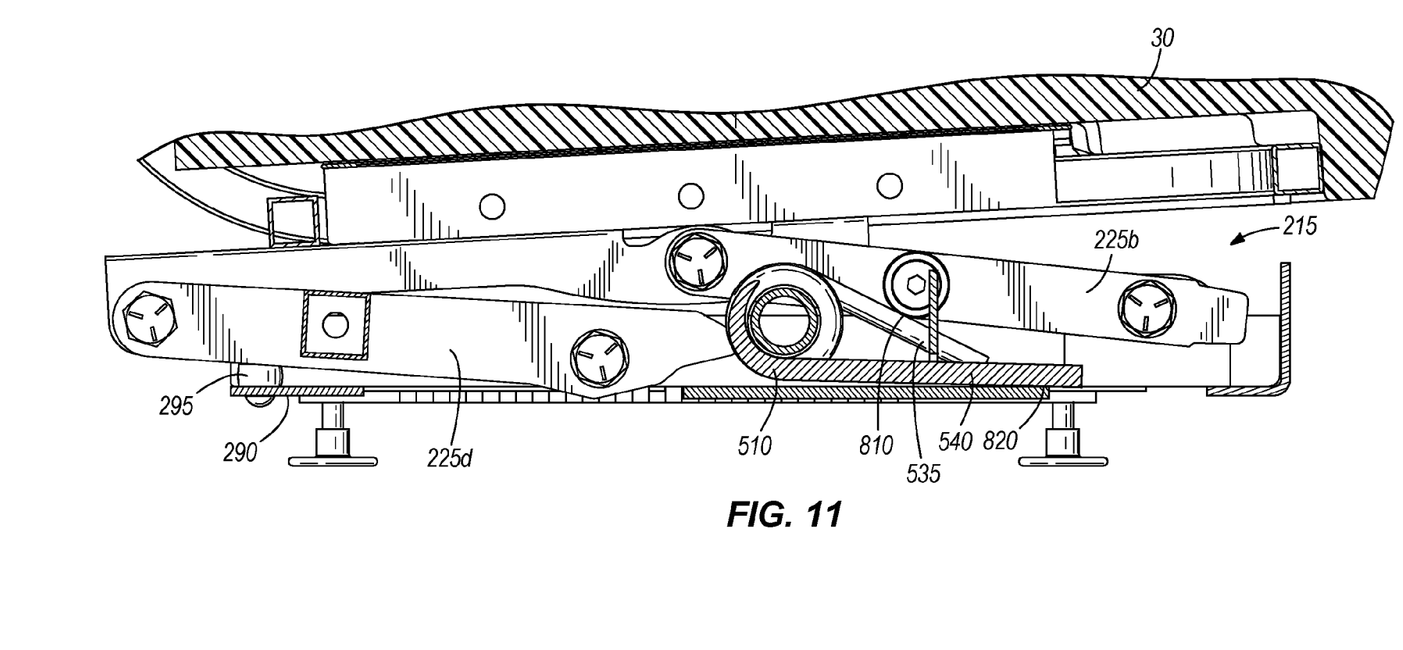
FIG. 11 is a cross-sectional view of the seat support assembly taken along line 9-9 in FIG. 2, with the suspension in a full-down position.

Operation of the suspension will be described with reference to FIGS. 9-11. The first end 535 of each torsion spring 510 abuts the roller bearing 370 above it, and the second end 540 abuts the support plate 520. The torsion springs 510 provide a biasing force that biases the roller bearings 370 and the support plate 520 away from each other. In this regard, the biasing force of the torsion springs 510 may be termed a "separating force." The suspension arms 225a, 225b, 225c, 225d are pivotally connected to the suspension base 223 at their first ends 310 and are pivotally connected to the seat frame 120 through the bottom mounting brackets 345 at their upper ends 315. Consequently, the left and right sides of the suspension 215 may each be termed a four-bar linkage (a parallelogram linkage in the illustrated embodiment), and the suspension 215 may be termed a pair of four-bar linkages, in the illustrated embodiment. As any of the suspension arms 225a, 225b, 225c, 225d pivots, the other suspension arms 225a, 225b, 225c, 225d must also pivot. The net result of the suspension arms 225a, 225b, 225c, 225d pivoting is that the seat 30 is moved up or down with respect to the suspension base 223.

Figure 9:
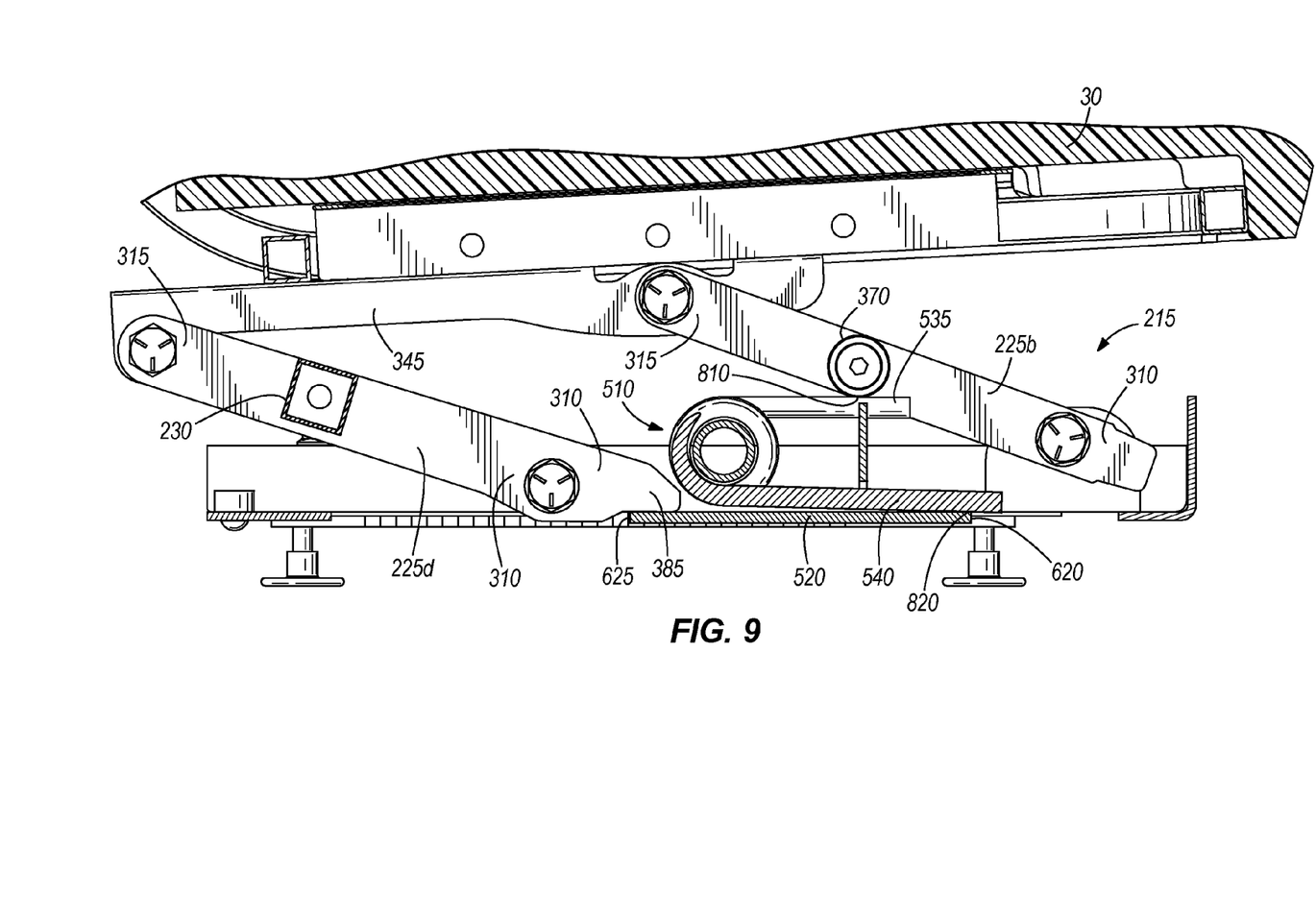
FIG. 9 is a cross-sectional view of the seat support assembly taken along line 9-9 in FIG. 2, with the suspension in a full-up position.

In FIG. 9, the suspension 215 is in a full-up position in which the range limiting projections 385 abut the rear edge 625 of the support plate 520 and the seat 30 is elevated as high as is permitted by the suspension 215. FIG. 11 illustrates the full-down position of the suspension 215, which is the opposite end of the suspension 215 range of motion from the full-up position. In the full-down position, the third and fourth suspension arms 225c, 225d bottom out on the bumpers 295 and the seat 30 is at the lowest position permitted by the suspension 215. In its ordinary operating mode (e.g., a person of typical weight operating the vehicle 10 at typical operating speeds on terrain that is not unusually rough), the suspension 215 gives the rider a smooth ride in the seat 30 as the vehicle 10 moves over bumps in the terrain. In such ordinary operating mode, the suspension 215 permits the seat to float between the full-up and full-down positions, as is illustrated in FIG. 10.

Figure 12:
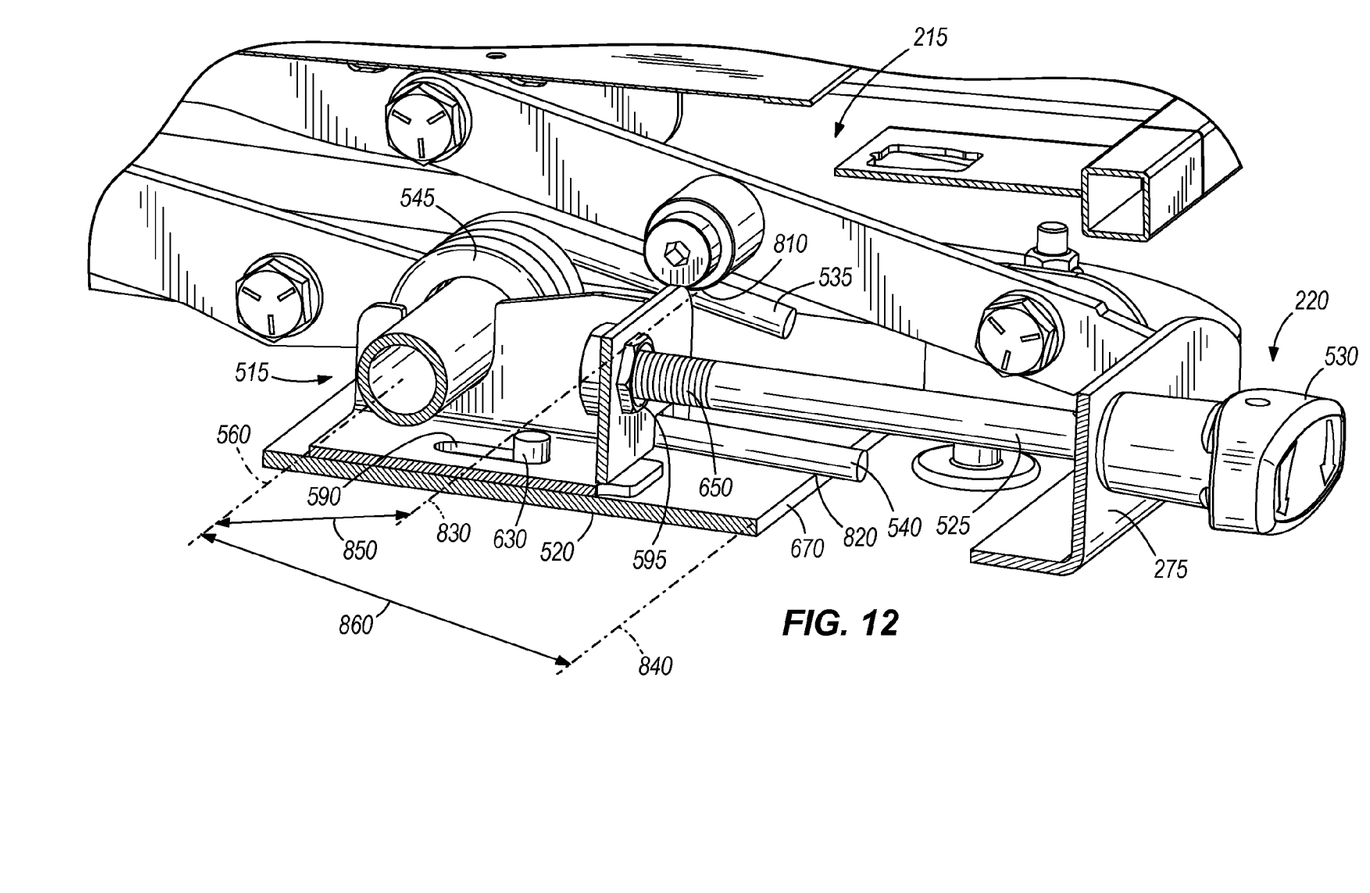
FIG. 12 is a cross-sectional, perspective view taken along line 12-12 in FIG. 3, illustrating the seat support assembly in a soft suspension position.
Figure 13:
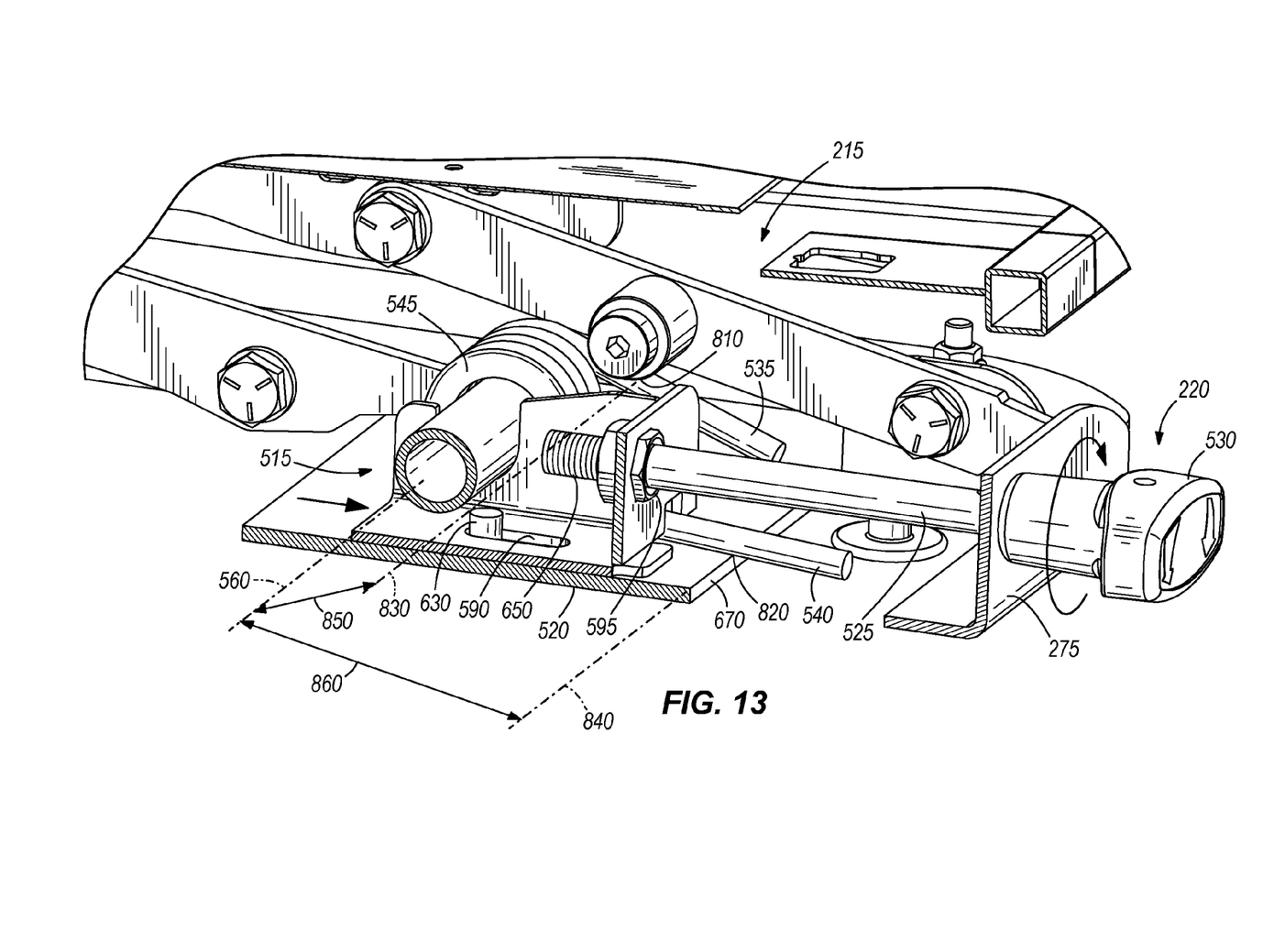
FIG. 13 is a cross-sectional, perspective view taken along line 12-12 in FIG. 3, illustrating the seat support assembly in a stiff suspension position at the same suspension stroke height as FIG. 12.

With reference to FIGS. 12 and 13, the stiffness of the suspension 215 may be adjusted by way of the suspension adjustment mechanism 220. The "stiffness" of the suspension 215 refers to the degree to which the suspension 215 resists dynamic loading. The suspension 215 is said to have higher stiffness (or to be "stiffer" or "more stiff") when a higher load is required to push the seat 30 down from the full-up position, and is said to have lower stiffness (or to be "softer" or "less stiff") when a lower load is required to push the seat 30 down from the full-up position. The stiffness of the suspension 215 is a function of the moment arm length between the torsion spring axes 560 and the points of contact of the roller bearings 370 on the first ends 535, and the moment arm length between the torsion spring axes 560 and the points of contact of the support plate 520 and the second ends 540.

A first point of contact 810 is the region at which each roller bearing 370 touches the first end 535 of the associated torsion spring 510. A second point of contact 820 is the region at which the second end 540 abuts and bears against the support plate 520, generally at or near the front edge 620. For the purposes of illustration in FIGS. 12 and 13, a line 830 extends from the first point of contact 810 parallel to the torsion spring axis 560, and a line 840 extends from the second point of contact 820 parallel to the torsion spring axis 560. A first moment arm 850 (the length of which may be referred to as the "moment arm distance" between the torsion spring axis 560 and the first point of contact 810) extends from the spring axis 560 to the line 830, perpendicular to both. A second moment arm 860 (the length of which may be referred to as the "moment arm distance" between the torsion spring axis 560 and the second point of contact 820) extends from the spring axis 560 to the line 840, perpendicular to both.

The suspension adjustment mechanism 220 permits the operator to simultaneously change the length of the first moment arm 850 and the length of the second moment arm 860 for each torsion spring 510. This is accomplished by moving the spring support 515 forward and rearward within the range of motion permitted by the slot 590 and stopper 630. Moving the spring support 515 forward moves the first point of contact 810 and the second point of contact 820 along the length of the respective first end 535 and second end 540 of the torsion spring, toward the coil 545. Such forward movement decreases the moment arms and thereby increases the stiffness of the suspension, as shown in FIG. 13. Moving the spring support 515 rearward moves the first point of contact 810 and the second point of contact 820 along the length of the respective first end 535 and second end 540 of the torsion spring, away from the coil 545. Such rearward movement increases the moment arms and thereby decreases the stiffness of the suspension, as shown in FIG. 12.

In FIG. 12, the spring support 515 is moved rearward as far as possible (due to the stopper 630 abutting the front end of the slot 590), which maximizes the length of the first moment arm 850 and the second moment arm 860 (resulting in a relatively soft suspension). In FIG. 13, the spring support 515 is moved forward as far as possible (due to the stopper 630 abutting the rear end of the slot 590), which minimizes the length of the first moment arm 850 and the second moment arm 860 (resulting in relatively stiff suspension). To move the spring support 515 to a desired position to achieve a desired stiffness in the suspension 215, an operator grasps and rotates the handle 530 clockwise (as the arrow in FIG. 13 indicates) to stiffen the suspension 215 and counterclockwise to soften the suspension 215. This rotates the adjustment rod 525 about its longitudinal axis 665, which rotates the threaded end 650 in the threaded aperture 595, thereby causing the spring support 515 to slide toward or away from the support plate 275. When the handle 530 is turned clockwise and the spring support 515 is pulled toward the support plate 275, the adjustment rod 525 bears against the front surface of the support plate 275 through the head 655 and the end wall 725 of the handle 530. When the handle 530 is turned counterclockwise and the spring support 515 is pushed away from the support plate 275, the adjustment rod 525 bears against the rear surface of the support plate 275 through the pin 750 and low-friction bushing 285.

The suspension adjustment mechanism 220 is infinitely adjustable between the positions illustrated in FIGS. 12 and 13. An operator merely turns the handle 530 until a desired stiffness in the suspension 215 is achieved, and the suspension adjustment mechanism 220 will remain in that position due to the friction within the threaded engagement of the adjustment rod 525 and the spring support 515 and the friction between the spring support 515 and the support plate 520.

The suspension adjustment mechanism 220 rapidly changes suspension stiffness because it simultaneously changes the length of the first and second moment arms 850, 860. A system which only changes the length of one of the moment arms by moving a single point of contact would have to move the point of contact twice as far as the present invention to achieve the same change in suspension stiffness.

It should be noted that in other embodiments the bearing surfaces 370 could be provided on parts of the system other than the suspension arms as illustrated. Regardless of the actual construction, the suspension adjustment mechanism 220 is movable between a first position in which the first and second moment arm distances are relatively short such that the torsion spring provides relatively stiff resistance to pivotal movement of the suspension arms (whether or not the bearing surfaces are on the suspension arms themselves), and a second position in which the first and second moment arm distances are relatively long such that the torsion spring provides relatively soft resistance to pivotal movement of the suspension arm (whether or not the bearing surfaces are on the suspension arms themselves).

Various features and advantages of the invention are set forth in the following claims.

What is claimed is:

1. A seat support assembly, comprising:
    a base;
    first, second, third, and fourth suspension arms, each mounted at a first end to the base and moveable with respect to the base, and adapted for mounting to a seat at a second end opposite the first end, the arms being moveable with respect to the seat;
    a torsion spring having a first end defining a length, a second end defining a length, and a coil extending between and substantially perpendicular to the first and second ends, the coil defining a torsion spring axis;
    a first bearing surface abutting the first end of the torsion spring at a first abutment point to define a first moment arm distance from the first abutment point to the torsion spring axis;
    a second bearing surface abutting the second end of the torsion spring at a second abutment point to define a second moment arm distance from second abutment point to the torsion spring axis; and
    an adjustment mechanism for simultaneously causing relative movement between the torsion spring and the first and second bearing surfaces to simultaneously move the first abutment point along the length of the first end of the torsion spring to change the first moment arm distance and move the second abutment point along the length of the second end of the torsion spring to change the second moment arm distance.

2. The system of claim 1, wherein the adjustment mechanism includes a torsion spring support supporting the torsion spring; and wherein the adjustment mechanism moves the torsion spring with respect to the first and second bearing surfaces perpendicular to the torsion spring axis.

3. The system of claim 2, wherein the torsion spring support is mounted for linear sliding on the base.

4. The system of claim 3, wherein the adjustment mechanism includes means for limiting movement of the torsion spring support between a first position in which the first and second moment arm distances are relatively short such that the torsion spring provides relatively stiff resistance to pivotal movement of the suspension arms, and a second position in which the first and second moment arm distances are relatively long such that the torsion spring provides relatively soft resistance to pivotal movement of the suspension arms.

5. The system of claim 4, wherein the means for limiting includes a slot and tab; and wherein the first position is defined by the tab contacting a first end of the slot and the second position is defined by the tab contacting a second end of the slot opposite the first end.

6. The system of claim 2, wherein the adjustment mechanism includes means for infinitely adjusting the first and second moment arm distances within a range of distances to consequently adjust the degree to which the torsion spring resists pivotal movement of the suspension arms.

7. The system of claim 1, wherein the adjustment mechanism includes a torsion spring support for supporting the torsion spring, and an adjustment rod having a longitudinal axis perpendicular to the torsion spring axis; wherein the adjustment rod is threadedly engaged with a portion of the torsion spring support such that rotation of the adjustment rod about the longitudinal axis causes linear movement of the torsion spring support perpendicular to the torsion spring axis.

8. The system of claim 7, wherein the base includes a vertical support having a bearing surface for supporting the adjustment rod for rotation about the longitudinal axis; and wherein the adjustment mechanism further includes a handle mounted to the adjustment rod for facilitating rotation of the adjustment rod.

9. The system of claim 8, wherein the adjustment rod includes a first end having threads to threadedly engage the torsion spring support and a second end opposite the first end having a bolt head; and wherein the handle fits on the bolt head of the second end of the adjustment rod.

10. The system of claim 1, wherein the first bearing surface is interconnected with at least one of the suspension arms.

11. The system of claim 1, wherein the torsion spring is a first torsion spring, the system further comprising:
    a second torsion spring having first and second ends and a coil between the first and second ends, the coil defining a second torsion spring axis parallel to the torsion spring axis of the first torsion spring;
    a third bearing surface abutting the first end of the second torsion spring to define a third moment arm distance with respect to the second torsion spring axis; and
    a fourth bearing surface abutting the second end of the second torsion spring to define a fourth moment arm distance with respect to the second torsion spring axis;
    wherein the adjustment mechanism simultaneously causes relative movement between the first torsion spring and the first and second bearing surfaces and between the second torsion spring and the third and fourth bearing surfaces to simultaneously change the first moment arm distance, second moment arm distance, third moment arm distance, and fourth moment arm distance.

12. The system of claim 11, wherein the third bearing surface is interconnected with at least one of the suspension arms.

13. A seat support assembly, comprising:
- a base;
- a suspension including a plurality of suspension arms, each mounted at a first end to the base and moveable with respect to the base, and adapted for mounting to a seat at a second end opposite the first end, the arms being moveable with respect to the seat;
- a torsion spring having a first end defining a length, a second end defining a length, and a coil extending between and substantially perpendicular to the first and second ends, the coil defining a torsion spring axis;
- a first bearing surface abutting the first end of the torsion spring at a first abutment point to define a first moment arm distance from the first abutment point to the torsion spring axis;
- a second bearing surface abutting the second end of the torsion spring at a second abutment point to define a second moment arm distance from second abutment point to the torsion spring axis; and
- an adjustment mechanism for simultaneously causing relative movement between the torsion spring and the first and second bearing surfaces to simultaneously move the first abutment point along the length of the first end of the torsion spring to change the first moment arm distance and move the second abutment point along the length of the second end of the torsion spring to change the second moment arm distance.

14. The system of claim 13, wherein the adjustment mechanism includes a torsion spring support supporting the torsion spring; and wherein the adjustment mechanism moves the torsion spring with respect to the first and second bearing surfaces perpendicular to the torsion spring axis.

15. The system of claim 14, wherein the torsion spring support is mounted for linear sliding on the base.

16. The system of claim 15, wherein the adjustment mechanism includes means for limiting movement of the torsion spring support between a first position in which the first and second moment arm distances are relatively short such that the torsion spring provides relatively stiff resistance to pivotal movement of the suspension arms, and a second position in which the first and second moment arm distances are relatively long such that the torsion spring provides relatively soft resistance to pivotal movement of the suspension arms.

17. The system of claim 16, wherein the means for limiting includes a slot and tab; and wherein the first position is defined by the tab contacting a first end of the slot and the second position is defined by the tab contacting a second end of the slot opposite the first end.

18. The system of claim 14, wherein the adjustment mechanism includes means for infinitely adjusting the first and second moment arm distances within a range of distances to consequently adjust the degree to which the torsion spring resists pivotal movement of the suspension arms.

19. The system of claim 13, wherein the adjustment mechanism includes a torsion spring support for supporting the torsion spring, and an adjustment rod having a longitudinal axis perpendicular to the torsion spring axis; wherein the adjustment rod is threadedly engaged with a portion of the torsion spring support such that rotation of the adjustment rod about the longitudinal axis causes linear movement of the torsion spring support perpendicular to the torsion spring axis.

20. The system of claim 19, wherein the base includes a vertical support having a bearing surface for supporting the adjustment rod for rotation about the longitudinal axis; and wherein the adjustment mechanism further includes a handle mounted to the adjustment rod for facilitating rotation of the adjustment rod.

21. The system of claim 20, wherein the adjustment rod includes a first end having threads to threadedly engage the torsion spring support and a second end opposite the first end having a bolt head; and wherein the handle fits on the bolt head of the second end of the adjustment rod.

22. The system of claim 13, wherein the first bearing surface is interconnected with at least one of the plurality of suspension arms.

23. The system of claim 13, wherein the torsion spring is a first torsion spring, the system further comprising:
- a second torsion spring having first and second ends and a coil between the first and second ends, the coil defining a second torsion spring axis parallel to the torsion spring axis of the first torsion spring;
- a third bearing surface abutting the first end of the second torsion spring to define a third moment arm distance with respect to the second torsion spring axis; and
- a fourth bearing surface abutting the second end of the second torsion spring to define a fourth moment arm distance with respect to the second torsion spring axis;
- wherein the adjustment mechanism simultaneously causes relative movement between the first torsion spring and the first and second bearing surfaces and between the second torsion spring and the third and fourth bearing surfaces to simultaneously change the first moment arm distance, second moment arm distance, third moment arm distance, and fourth moment arm distance.

24. The system of claim 23, wherein the third bearing surface is interconnected with at least one of the suspension arms.

* * * * *